US010831009B2

United States Patent
Shiraishi

(10) Patent No.: US 10,831,009 B2
(45) Date of Patent: Nov. 10, 2020

(54) PHASE CONTRAST MICROSCOPE AND IMAGING METHOD

(71) Applicant: FUJIFILM Corporation, Tokyo (JP)

(72) Inventor: Yasushi Shiraishi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 244 days.

(21) Appl. No.: 16/053,509

(22) Filed: Aug. 2, 2018

(65) Prior Publication Data

US 2019/0033569 A1     Jan. 31, 2019

Related U.S. Application Data

(63) Continuation of application No. PCT/JP2017/005128, filed on Feb. 13, 2017.

(30) Foreign Application Priority Data

Feb. 22, 2016 (JP) .................. 2016-030705

(51) Int. Cl.
*G02B 21/14* (2006.01)
*G02B 27/00* (2006.01)
(Continued)

(52) U.S. Cl.
CPC .............. *G02B 21/14* (2013.01); *G02B 3/14* (2013.01); *G02B 21/086* (2013.01); *G02B 21/36* (2013.01);
(Continued)

(58) Field of Classification Search
None
See application file for complete search history.

(56) References Cited

U.S. PATENT DOCUMENTS

2012/0257040 A1   10/2012   Koebler et al.
2017/0322405 A1   11/2017   Matsubara

FOREIGN PATENT DOCUMENTS

| EP | 3318913 A1 | 5/2018 |
| JP | 2015-152649 A | 8/2015 |
| WO | WO 2016/084551 A1 | 6/2016 |

OTHER PUBLICATIONS

Korean Notification of Reason for Refusal for counterpart Korean Application No. 10-2018-7022710, dated Apr. 29, 2019, with English translation.

(Continued)

*Primary Examiner* — Darryl J Collins
*Assistant Examiner* — Journey F Sumlar
(74) *Attorney, Agent, or Firm* — Birch, Stewart, Kolasch & Birch, LLP

(57) ABSTRACT

A phase contrast microscope includes: an illumination light emission unit that emits illumination light for phase difference measurement to a container in which a liquid and an observation target are contained; an imaging unit that images the observation target irradiated with the illumination light; an adjustment optical system that adjusts refraction of the illumination light due to a liquid surface shape of the liquid in the container; a liquid surface shape estimation unit that estimates the liquid surface shape of the liquid in the container based on a brightness distribution of a phase difference image of the observation target captured by the imaging unit; and an adjustment information acquisition unit that acquires adjustment information for adjusting optical characteristics of the adjustment optical system based on the liquid surface shape estimated by the liquid surface shape estimation unit.

20 Claims, 9 Drawing Sheets

(51) Int. Cl.
G02B 3/14 (2006.01)
G02B 21/36 (2006.01)
G02B 26/08 (2006.01)
G02B 26/06 (2006.01)
G02B 21/08 (2006.01)
G06T 7/55 (2017.01)
H04N 5/235 (2006.01)
G06T 5/00 (2006.01)

(52) U.S. Cl.
CPC ........... *G02B 21/365* (2013.01); *G02B 26/06* (2013.01); *G02B 26/0875* (2013.01); *G02B 27/0068* (2013.01); *G06T 7/55* (2017.01); *H04N 5/2351* (2013.01); *G06T 5/002* (2013.01); *G06T 2207/10056* (2013.01)

(56) References Cited

OTHER PUBLICATIONS

Carl, "Radial Profile Extended—ImageJ," Nov. 5, 2014, Retrieved from the Internet: URL:https://web.archive.org/web/20141105180850/https://imagej.nih.gov/ij/plugins/radial-profile-ext.html [retrieved on Jan. 25, 2019], XP055547460, pp. 1-2.

Extended European Search Report, dated Feb. 4, 2019, for corresponding European Application No. 17756280.8.

Japanese Office Action, dated Feb. 19, 2019, for corresponding Japanese Application No. 2016-030705, along with an English translation.

POSITION ADJUSTMENT OF ADJUSTMENT OPTICAL ELEMENT

OPTICAL AXIS ROTATION ADJUSTMENT OF ADJUSTMENT OPTICAL ELEMENT

FOCAL POWER ADJUSTMENT OF ADJUSTMENT OPTICAL ELEMENT

PHASE CONTRAST MICROSCOPE AND IMAGING METHOD

CROSS-REFERENCE TO RELATED APPLICATIONS

This application is a Continuation of PCT International Application No. PCT/JP2017/005128 filed on Feb. 13, 2017, which claims priority under 35 U.S.C. § 119(a) to Japanese Patent Application No. 2016-030705 filed on Feb. 22, 2016. Each of the above application(s) is hereby expressly incorporated by reference, in its entirety, into the present application.

BACKGROUND OF THE INVENTION

1. Field of the Invention

The present invention relates to a phase contrast microscope for performing phase difference measurement of an observation target in a liquid and an imaging method thereof.

2. Description of the Related Art

In recent years, phase difference measurement has started to be widely used as a method for observing transparent cultured cells, such as stem cells, achromatically. A phase contrast microscope is used as one that performs such phase difference measurement.

In a general phase contrast microscope, ring-shaped illumination light is emitted to an observation target, and direct light and diffracted light having passed through the observation target are incident on a phase plate. Then, the direct light is attenuated by a ring portion of the phase plate, and the diffracted light passes through a transparent portion of the phase plate. By imaging the direct light and the diffracted light, it is possible to capture an image with a contrast of bright and dark.

Here, in the case of observing cells or the like in a culture solution with a phase contrast microscope, a meniscus is formed on the liquid surface of the culture solution due to the influence of the surface tension of the culture solution. Due to the lens action of the meniscus, the optical path of the ring-shaped illumination light is shifted. Since this affects the direct light and the diffracted light incident on the phase plate, there is a problem that a clear phase difference image cannot be obtained.

In order to compensate for the optical path deviation due to the meniscus, information of the liquid surface shape formed by the meniscus is required. In a case where the liquid surface shape is known, it is possible to compensate for the optical path deviation. However, since the liquid surface formed by the meniscus is formed from the relationship between the material of the surface of a container, such as a well plate, and a liquid contained in the container, it is difficult to compensate for the optical path deviation considering all possible combinations that can be realistically present. Even within the same well, the liquid surface shape locally differs depending on the type and amount of liquid contained in the well and the state of the surface within the well. Therefore, it is not sufficient to measure the liquid surface shape once, but it is necessary to measure the liquid surface shape every observation. In addition, in the case of performing time-lapse imaging, the water level in the container changes due to evaporation of the solution, and the liquid surface shape also changes accordingly.

Therefore, for example, JP2015-152650A discloses emitting measurement light to a plurality of positions on the liquid surface of the culture solution, detecting the amount of deviation of the measurement light, and calculating the shape of the liquid surface of the culture solution based on the amount of deviation.

SUMMARY OF THE INVENTION

In the apparatus disclosed in JP2015-152650A, however, a configuration for emitting measurement light is required. Therefore, since the apparatus becomes large, there is a problem that the cost increases.

In view of the aforementioned problem, it is an object of the present invention to provide a phase contrast microscope and an imaging method capable of estimating the liquid surface shape of a liquid in a container without providing a new measurement system for determining the shape of the liquid surface.

A phase contrast microscope of the present invention comprises: an illumination light emission unit that emits illumination light for phase difference measurement to a container in which a liquid and an observation target are contained; an imaging unit that images the observation target irradiated with the illumination light; an adjustment optical system that adjusts refraction of the illumination light due to a liquid surface shape of the liquid in the container; a liquid surface shape estimation unit that estimates the liquid surface shape of the liquid in the container based on a brightness distribution of a phase difference image of the observation target captured by the imaging unit; and an adjustment information acquisition unit that acquires adjustment information for adjusting optical characteristics of the adjustment optical system based on the liquid surface shape estimated by the liquid surface shape estimation unit.

In the phase contrast microscope of the present invention described above, it is preferable to further comprise an adjustment optical system control unit that adjusts the optical characteristics of the adjustment optical system based on the adjustment information acquired by the adjustment information acquisition unit.

In the phase contrast microscope of the present invention described above, it is preferable that the liquid surface shape estimation unit estimates the liquid surface shape of the liquid in the container based on a brightness distribution of a phase difference image acquired by performing a geometric optical simulation using a liquid surface shape set in advance.

In the phase contrast microscope of the present invention described above, it is preferable that the liquid surface shape estimation unit estimates the liquid surface shape of the liquid in the container based on brightness distributions of a plurality of phase difference images acquired by performing a geometric optical simulation using a plurality of liquid surface shapes that have different curvatures and are set in advance.

In the phase contrast microscope of the present invention described above, it is preferable that the liquid surface shape estimation unit estimates the liquid surface shape of the liquid in the container by calculating a correlation between the brightness distribution of the phase difference image acquired by using the geometric optical simulation and the brightness distribution of the phase difference image captured by the imaging unit.

In the phase contrast microscope of the present invention described above, it is preferable that the liquid surface shape estimation unit calculates the correlation using a correlation function.

In the phase contrast microscope of the present invention described above, it is preferable that the liquid surface shape estimation unit calculates the correlation based on a brightness value of an inflection point in the brightness distribution of the phase difference image acquired by using the geometric optical simulation and a brightness value of an inflection point in the brightness distribution of the phase difference image captured by the imaging unit.

In the phase contrast microscope of the present invention described above, it is preferable that the liquid surface shape estimation unit sets at least one straight line, which extends from a central portion of a meniscus formed in the container toward an outer periphery of the container, on the phase difference image captured by the imaging unit and estimates the liquid surface shape of the liquid in the container based on a brightness distribution of the phase difference image on the set straight line.

In the phase contrast microscope of the present invention described above, it is preferable that the liquid surface shape estimation unit sets the straight lines extending in a plurality of different directions and estimates the liquid surface shape of the liquid in the container based on brightness distributions of phase difference images on the plurality of straight lines.

In the phase contrast microscope of the present invention described above, it is preferable that the liquid surface shape estimation unit performs smoothing processing on the phase difference image captured by the imaging unit, and estimates the liquid surface shape of the liquid in the container based on a brightness distribution of a phase difference image subjected to the smoothing processing.

An imaging method of the present invention comprises: capturing a phase difference image of an observation target by emitting illumination light for phase difference measurement to a container in which a liquid and the observation target are contained; estimating a liquid surface shape of the liquid based on a brightness distribution of the captured phase difference image; acquiring adjustment information for adjusting optical characteristics of an adjustment optical system, which adjusts refraction of light due to a liquid surface shape of the liquid in the container, based on the estimated liquid surface shape; emitting the illumination light to the container after the optical characteristics of the adjustment optical system are adjusted based on the adjustment information; and imaging the observation target irradiated with the illumination light.

According to the phase contrast microscope and the imaging method of the present invention, the liquid surface shape of the liquid in the container is estimated based on the brightness distribution of the phase difference image captured by the imaging unit that captures a phase difference image for observation. Therefore, it is possible to estimate the liquid surface shape of the liquid in the container without providing a new measurement system for estimating the liquid surface shape.

DESCRIPTION OF THE PREFERRED EMBODIMENTS

Figure 1:
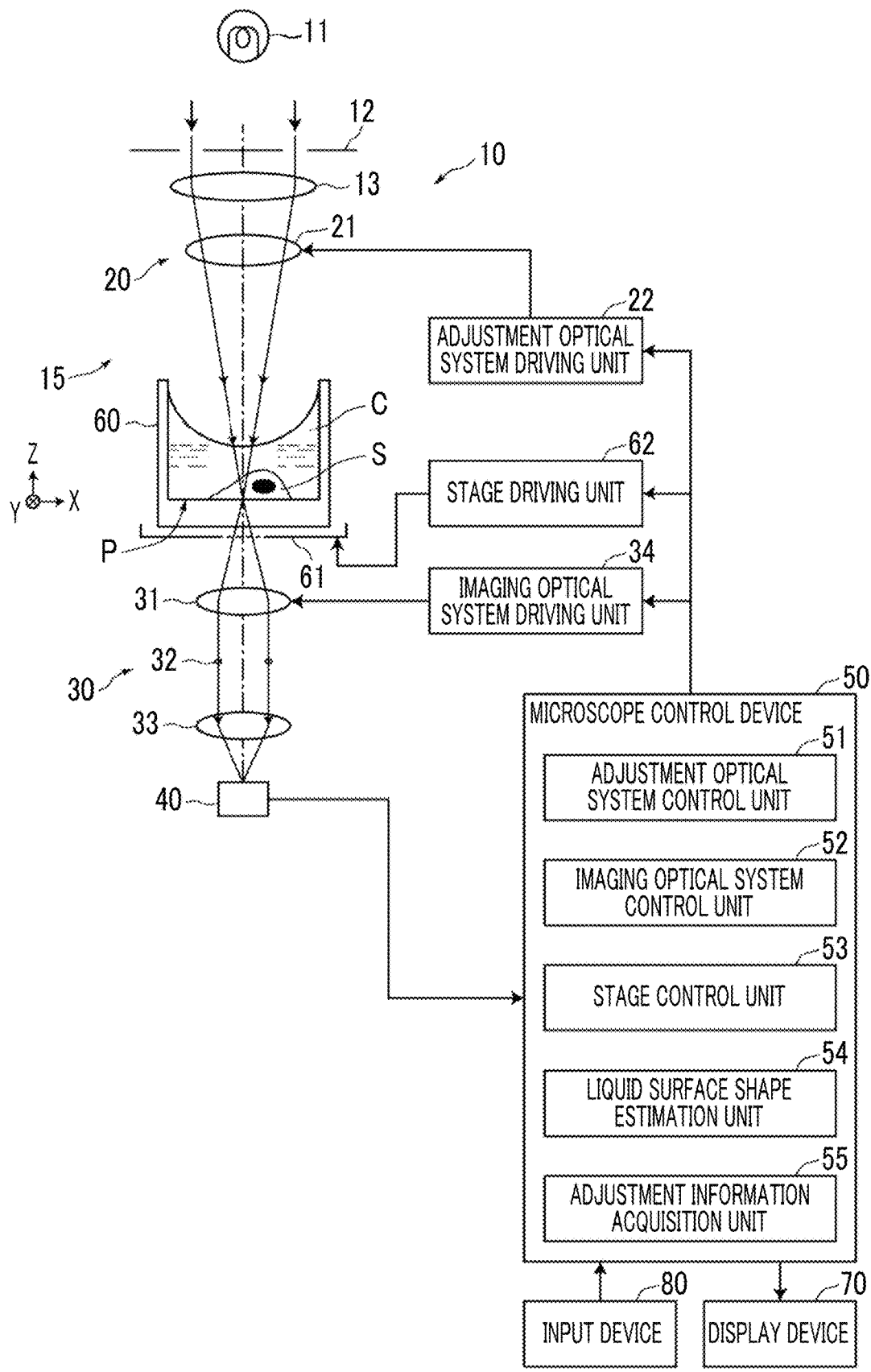
FIG. 1 is a diagram showing the schematic configuration of a microscope system using an embodiment of a phase contrast microscope of the present invention.

Hereinafter, a microscope system using an embodiment of a phase contrast microscope and an imaging method of the present invention will be described in detail with reference to the diagrams. FIG. 1 is a diagram showing the schematic configuration of the microscope system of the present embodiment.

As shown in FIG. 1, the microscope system of the present embodiment includes an illumination light emission unit 10, an adjustment optical system 20, an imaging optical system 30, an imaging unit 40, a microscope control device 50, a display device 70, and an input device 80.

In the microscope system of the present embodiment, a stage 61 is provided between the adjustment optical system 20 and the imaging optical system 30, and a culture container 60 in which a culture solution C as a liquid and an observation target S are contained is provided on the stage 61. The microscope system of the present embodiment includes a stage driving unit 62 for moving the stage 61 in X, Y, and Z directions. The X and Y directions are directions perpendicular to each other on a plane parallel to an observation target placement surface P, and the Z direction is a direction perpendicular to the X and Y directions.

In the microscope system of the present embodiment, a phase contrast microscope body is formed by the illumination light emission unit 10, the adjustment optical system 20, the imaging optical system 30, the imaging unit 40, the stage 61, and the stage driving unit 62 that have been described above and an imaging optical system driving unit 34, and the microscope control device 50 controls the phase contrast microscope body. Hereinafter, the specific configuration of the phase contrast microscope body will be described.

The illumination light emission unit 10 emits illumination light for so-called phase difference measurement to the observation target S contained in the culture container 60. In the present embodiment, the illumination light emission unit 10 emits ring-shaped illumination light as the illumination light for phase difference measurement. Specifically, the illumination light emission unit 10 of the present embodiment includes: a white light source 11 that emits white light; a slit plate 12 which has a ring-shaped slit, on which the white light emitted from the white light source 11 is incident, and which emits ring-shaped illumination light; and a condenser lens 13 on which the ring-shaped illumination light emitted from the slit plate 12 is incident and which emits the incident ring-shaped illumination light to the observation target S.

The slit plate 12 is obtained by providing a ring-shaped slit, through which white light is transmitted, on a light screen for shielding the white light emitted from the white light source 11. The white light passes through the slit to form ring-shaped illumination light.

In the present embodiment, the ring-shaped illumination light is formed using the slit plate 12 as described above, but the method of forming the ring-shaped illumination light is not limited thereto. For example, the ring-shaped illumination light may be formed using a spatial light modulation element or the like.

In the present embodiment, the ring-shaped illumination light is used as illumination light for phase difference measurement, but illumination light having a shape other than the ring shape may be used. Other shapes, such as a triangular shape or a quadrangular shape, may be used as long as the illumination light has a conjugate shape with a phase plate to be described later.

The culture container 60 placed on the stage 61 has its bottom surface as the observation target placement surface P, and a cell group or the like as the observation target S is disposed on the observation target placement surface P. The culture solution C is filled in the culture container 60, and a concave meniscus is formed on the liquid surface of the culture solution C. Examples of the culture container 60 include a laboratory dish and a well plate in which a plurality of wells are arranged. In the case of a well plate, the observation target S and the culture solution C are contained in each well, and a meniscus is formed for each well.

In the present embodiment, a cell group cultured in the culture solution is set as the observation target S. However, the observation target S is not limited to cells in the culture solution, and cells fixed in a liquid, such as water, formalin, ethanol, and methanol, may be set as the observation target S. Also in this case, a meniscus is formed on the liquid surfaces of these liquids in the container.

The adjustment optical system 20 adjusts the refraction of illumination light for phase difference measurement due to the liquid surface shape of the meniscus described above. The adjustment optical system 20 of the present embodiment includes an adjustment optical element 21 and an adjustment optical system driving unit 22.

The adjustment optical element 21 is an optical element having a focal power. Specifically, a plano-convex lens having a curvature on the incidence surface or the exit surface, a biconvex lens having a curvature on both the incidence surface and the exit surface, a liquid crystal lens whose focal power is changed by voltage application, a liquid lens whose radius of curvature can be changed, a spatial light modulator capable of changing the focal length, and the like can be used.

The adjustment optical system driving unit 22 adjusts the focal length by changing the focal power of the adjustment optical element 21 based on a control signal output from an adjustment optical system control unit 51 to be described later. Specifically, the adjustment optical system driving unit 22 includes a mechanism for changing the position and the optical axis direction of the adjustment optical element 21. In a case where a liquid crystal lens or a spatial light modulator is used as the adjustment optical element 21, the adjustment optical system driving unit 22 applies a voltage corresponding to a desired focal length to the liquid crystal lens or the spatial light modulator. In a case where a liquid lens is used as the adjustment optical element 21, the adjustment optical system driving unit 22 adjusts the amount of liquid in the liquid lens according to a desired focal length, thereby adjusting the radius of curvature of the liquid lens.

Figure 2A:
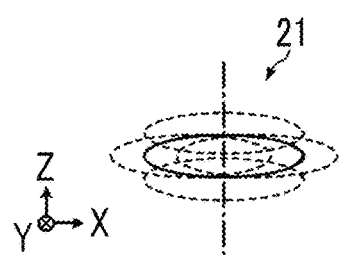
FIGS. 2A to 2C are diagrams schematically showing adjustments of the position of an adjustment optical element, rotation of an optical axis, and focal power.
Figure 2B:
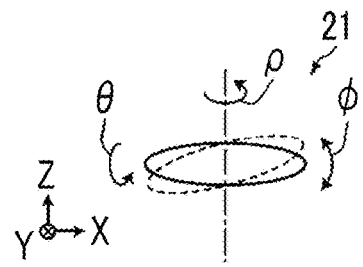
Figure 2C:
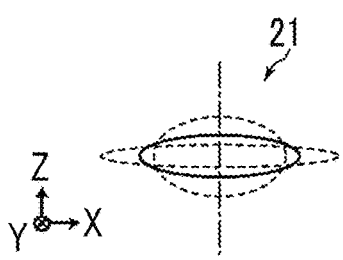

FIG. 2A is a diagram schematically showing a change in the position of the adjustment optical element 21 in the X, Y, and Z directions. FIG. 2B is a diagram schematically showing a change in the direction of the optical axis of the adjustment optical element 21. Specifically, FIG. 2B is a diagram schematically showing the rotation adjustment of the optical axis of the adjustment optical element 21 around the X axis ($\theta$), the rotation adjustment of the optical axis of the adjustment optical element 21 around the Y axis ($\phi$), and the rotation adjustment of the optical axis of the adjustment optical element 21 around the Z axis ($\rho$). FIG. 2C schematically shows the adjustment of the focal power of the adjustment optical element 21. Although FIG. 2C shows an example of adjusting the focal power by adjusting the radius of curvature of the adjustment optical element 21, the method of adjusting the focal power is not limited thereto. For example, in the case of using a liquid crystal lens or a spatial light modulator as the adjustment optical element 21, the focal power can be adjusted by adjusting the applied voltage.

In the present embodiment, the adjustment optical element 21 is moved in the X, Y, and Z directions. However, as long as the same operation as the optical operation by the movement of the adjustment optical element 21 can be obtained, the adjustment optical element 21 does not necessarily need to be moved. For example, in the case of using a liquid crystal lens or a spatial light modulator as the adjustment optical element 21, the same effect as the deviation of the optical axis by the movement of the adjustment optical element 21 may be obtained by adjusting the applied voltage. Also in the optical axis direction of the adjustment optical element 21, it is not always necessary to rotate the adjustment optical element 21 itself, and the same effect as the rotation of the optical axis by the rotation of the adjustment optical element 21 itself may be obtained by adjusting the applied voltage.

In the present embodiment, the adjustment optical element 21 is moved in the X and Y directions. However, the present invention is not limited thereto, and the relative positional relationship between the adjustment optical element 21 and the meniscus, which is formed in the culture container 60, in the X and Y directions may be changed by moving the stage 61 in the X and Y directions.

In the present embodiment, one adjustment optical element 21 is used. However, the focal power may be adjusted by performing switching between a plurality of adjustment optical elements 21 having different focal lengths. In this case, the adjustment optical elements 21 may be exchanged automatically or manually. In the case of manually exchanging a plurality of adjustment optical elements 21, information of the type of the appropriate adjustment optical element 21 may be displayed on the display device 70, for example, based on the liquid surface shape estimated by a liquid surface shape estimation unit 54 to be described later, so that the user may manually exchange the adjustment optical elements 21 based on the display.

The imaging optical system 30 includes an objective lens 31, a phase plate 32, an imaging lens 33, and the imaging optical system driving unit 34. The phase plate 32 is configured by forming a phase ring on a transparent plate that is transparent for the wavelength of the ring-shaped illumination light. In addition, the size of the slit of the slit plate 12 described above and the phase ring are in the conjugate relationship.

The phase ring is obtained by forming a phase film, which shifts the phase of incidence lay by ¼ wavelength, and a dimming filter, which is for attenuating the incidence lay, in a ring shape. Direct light incident on the phase plate 32 is transmitted through the phase ring. As a result, the phase of the direct light is shifted by ¼ wavelength, and the brightness is weakened. On the other hand, most of the diffracted light diffracted by the observation target S passes through the transparent plate of the phase plate 32, and the phase and the brightness are not changed.

The objective lens 31 is moved in the Z direction by the imaging optical system driving unit 34. In the case of capturing the phase difference image of the observation target S, autofocus control is performed by moving the objective lens 31 in the Z direction using the imaging optical system driving unit 34, so that the contrast of the image captured by the imaging unit 40 is adjusted.

Direct light and diffracted light having passed through the phase plate 32 are incident on the imaging lens 33, and these light beams are imaged on the imaging unit 40.

The imaging optical system driving unit 34 includes a mechanism for moving the objective lens 31 in the Z direction as described above.

The imaging unit 40 includes an imaging element for capturing a phase difference image of the observation target S formed by the imaging lens 33. As the imaging element, a charge-coupled device (CCD) image sensor, a complementary metal-oxide semiconductor (CMOS) image sensor, and the like can be used.

Here, capturing of a phase difference image by the phase contrast microscope body having the above-described configuration will be described. In addition, it is assumed that there is no influence of the meniscus formed on the liquid surface of the culture solution C herein.

First, ring-shaped illumination light emitted from the illumination light emission unit 10 is emitted to the observation target S. The illumination light emitted to the observation target S is divided into direct light having passed straight through the observation target S and diffracted light diffracted by the observation target S. Then, the direct light and the diffracted light transmitted through the observation target S are transmitted through the objective lens 31 and incident on the phase plate 32. The direct light transmitted through the observation target S is incident on the phase ring of the phase plate 32. As a result, the phase of the direct light is shifted by ¼ wavelength, and the brightness is weakened. On the other hand, most of the diffracted light transmitted through the observation target S passes through a transparent portion of the phase plate 32.

The direct light and the diffracted light transmitted through the phase plate 32 are imaged on the imaging surface of the imaging element by the imaging lens 33, and a phase difference image in which the contrast of an edge portion or the like is emphasized is captured by interference between the direct light and the diffracted light.

In the present embodiment, the inside of the culture container 60 is scanned with illumination light by moving the stage 61 in the X and Y directions, and a phase difference image is captured for each region irradiated with the illumination light in the culture container 60.

Then, the microscope control device 50 shown in FIG. 1 is a computer including a central processing unit (CPU), a memory, a hard disk, and the like.

Specifically, as shown in FIG. 1, the microscope control device 50 includes the adjustment optical system control unit 51 that controls the adjustment optical system driving unit 22, an imaging optical system control unit 52 that controls the imaging optical system driving unit 34, a stage control unit 53 that controls the stage driving unit 62, the liquid surface shape estimation unit 54 that estimates the liquid surface shape of the culture solution C in the culture container 60 based on the brightness distribution of the phase difference image captured by the imaging unit 40, and an adjustment information acquisition unit 55 that acquires adjustment information for adjusting the optical characteristics of the adjustment optical system 20 based on the liquid surface shape estimated by the liquid surface shape estimation unit 54.

Here, estimation of the liquid surface shape by the liquid surface shape estimation unit 54 of the present embodiment will be described in detail. The liquid surface shape estimation unit 54 estimates the liquid surface shape of the culture solution C in the culture container 60 based on the brightness distribution of the phase difference image captured by the imaging unit 40 as described above. First, the principle of estimating the liquid surface shape of the culture solution C based on the brightness distribution of the phase difference image in this manner will be described.

Figure 3A:
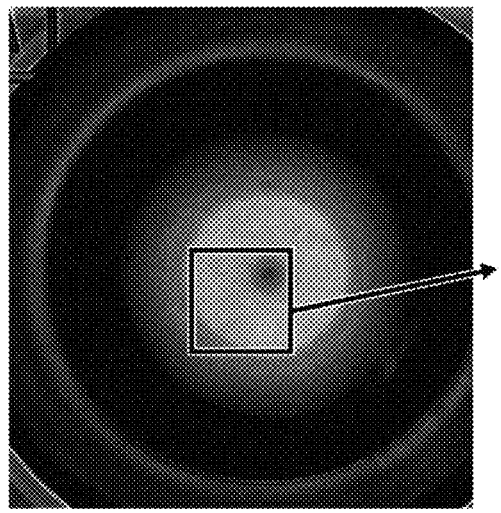
FIGS. 3A and 3B show examples of a bright and dark pattern appearing in a phase difference image.
Figure 3B:
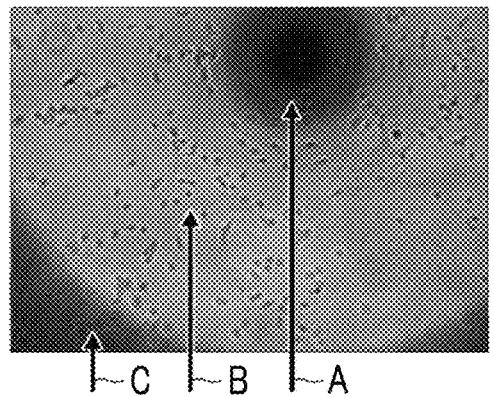

FIG. 3A shows an example of a phase difference image, and FIG. 3B is an enlarged view of a part (range surrounded by a square) of the phase difference image shown in FIG. 3A. In the phase difference image, as shown in FIGS. 3A and 3B, a bright and dark pattern (brightness distribution) is formed concentrically. The reason why such a bright and dark pattern is formed will be described below.

The illumination light transmitted through the central portion of the meniscus formed on the liquid surface of the culture solution C in the culture container 60 is hardly influenced by refraction due to the meniscus. Accordingly, the direct light is incident on the phase ring of the phase plate 32 to be attenuated. As a result, the phase difference image of the central portion of the meniscus becomes an image darker than the surroundings (range indicated by an arrow A in FIG. 3B). The central portion of the meniscus is a portion of the bottom surface of the meniscus including a position closest to the bottom surface of the culture container 60 in a case where a curved surface formed on the entire liquid surface in the culture container 60 is a meniscus.

Then, since the illumination light transmitted through the curved surface portion adjacent to the central portion of the meniscus is influenced by refraction due to the curved surface of the meniscus, the direct light is not incident on the phase ring of the phase plate 32 but passes through the transparent portion. As a result, the phase difference image of the curved surface portion becomes brighter than the phase difference image of the central portion (range indicated by an arrow B in FIG. 3B). However, even for a curved surface portion outside the central portion of the meniscus, illumination light transmitted through a portion away from the central portion to some extent is greatly refracted by the curved surface of the meniscus. Accordingly the direct light passes through the outside of the objective lens 31 and is not incident thereon. As a result, a dark phase difference image is formed (range indicated by an arrow C in FIG. 3B). Therefore, in the phase difference image, a concentric bright and dark pattern, such as that shown in FIGS. 3A and 3B, is formed by the above-described action.

The bright and dark pattern appearing in the phase difference image changes depending on the shape of the meniscus. In the present embodiment, therefore, the shape of the meniscus, that is, the liquid surface shape is estimated using the bright and dark pattern.

Specifically, in the present embodiment, a bright and dark pattern (brightness distribution) appearing on the phase difference image is acquired by performing geometric optical simulation using parameters of a known optical system, and the liquid surface shape of the culture solution C is estimated based on the bright and dark pattern acquired in advance by the geometric optical simulation.

For the geometric optical simulation, for example, a plurality of liquid surface shape (meniscus) models having different curvatures are set, the optical path deviation of incidence lay is calculated for each of the liquid surface shape models, and a bright and dark pattern appearing on the phase difference image is calculated based on the optical path deviation.

Figure 4:
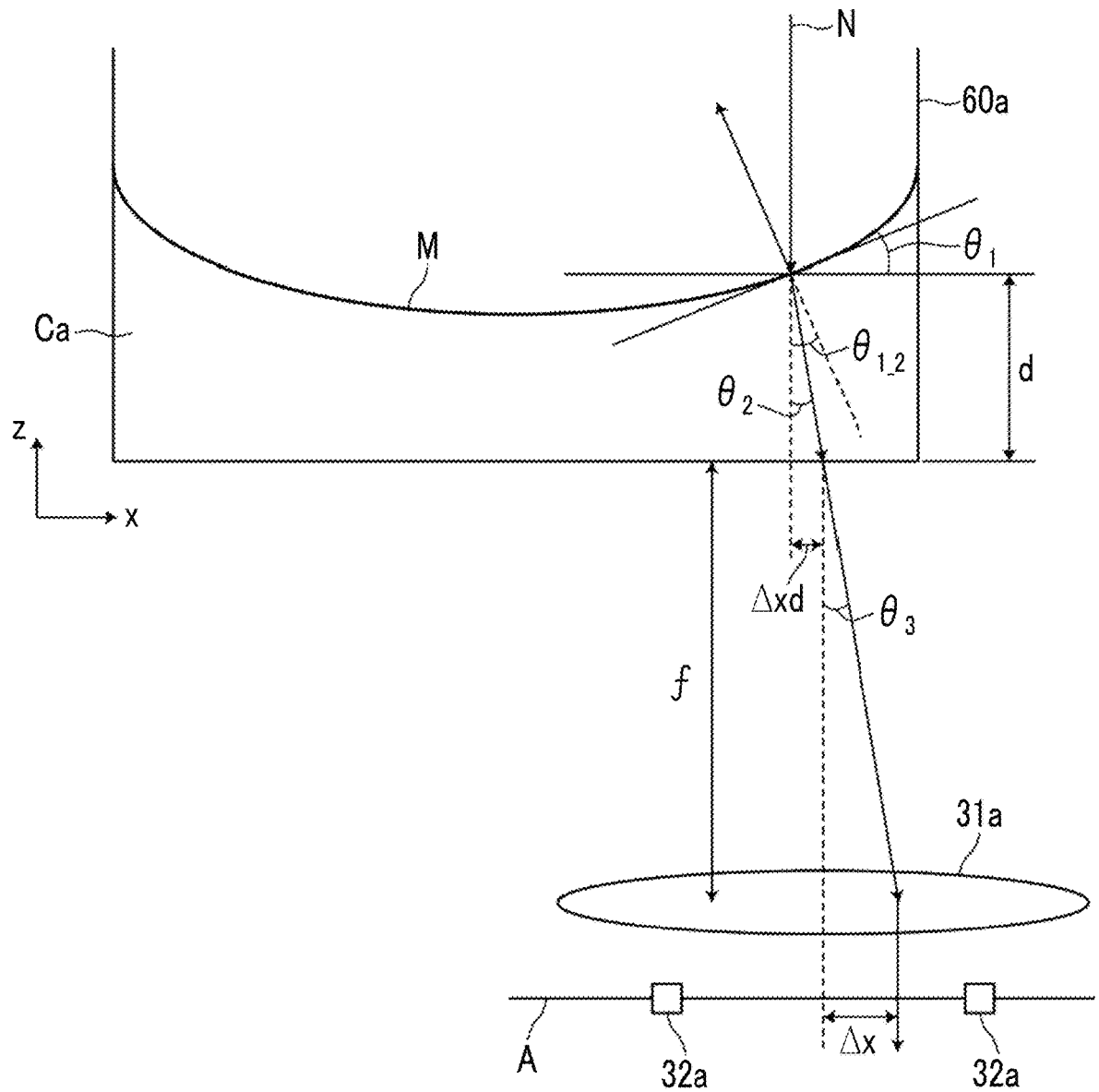
FIG. 4 is a diagram illustrating an example of a method of calculating the optical path deviation in a case where ring-shaped illumination light N is incident on a meniscus model M.

FIG. 4 is a diagram illustrating an example of a method of calculating the optical path deviation in a case where ring-shaped illumination light N is incident on a meniscus model M. 60a shown in FIG. 4 indicates a model of a culture container, 31a indicates a model of an objective lens, 32a indicates a model of a phase plate, and A indicates a plane at a position of the phase plate model 32a. In FIG. 4, assuming that the refractive index of air is 1 and the refractive index of a model Ca of the culture solution is 1.33 which is the same as water, $\theta_2$ is calculated by the following equations from the Snell's law.

$$\frac{\sin\theta_1}{\sin\theta_{1\_2}} = \frac{1.33}{1}$$

$$\theta_{1\_2} = \sin^{-1}\left[\frac{\sin\theta_1}{1.33}\right]$$

$$\theta_2 = \theta_1 - \theta_{1\_2}$$

Similarly, from the Snell's law, $\theta_3$ is calculated by the following equations.

$$\frac{\sin\theta_2}{\sin\theta_3} = \frac{1}{1.33}$$

$$\theta_3 = \sin^{-1}[1.33\sin\theta_2]$$

Then, an optical path deviation $\Delta x$ from the optical axis can be calculated by the following equation. It is assumed that f is the focal length of the objective lens model 31a and the focal position of the objective lens model 31a is in focus on the bottom surface of the culture container model 60a.

$$\Delta x = f \tan\theta_3$$

Figure 5:
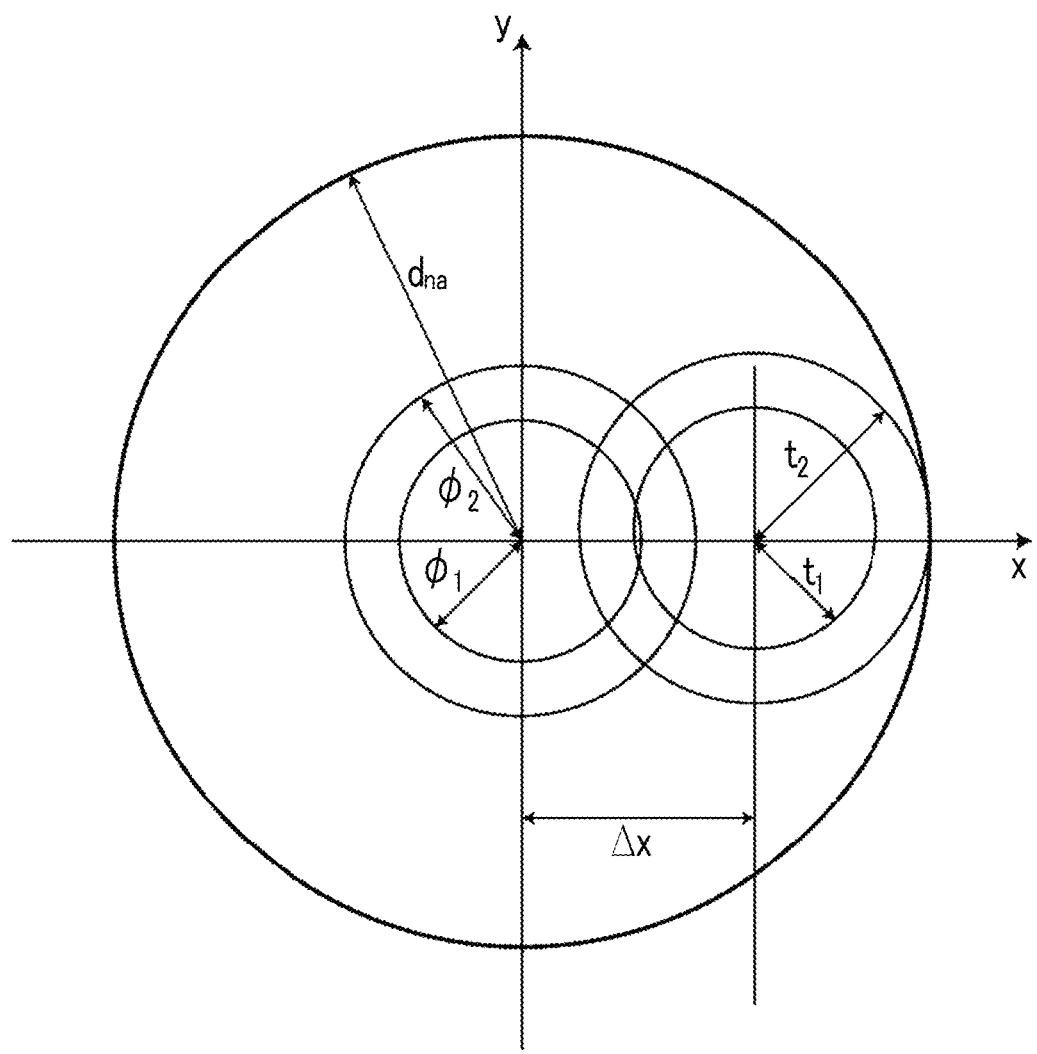
FIG. 5 is a diagram showing the relationship between a range $d_{na}$ where the ring-shaped illumination light N is incident on an objective lens model and an optical path deviation $\Delta x$ on a plane A.

A range $d_{na}$ where the ring-shaped illumination light N is incident on the objective lens model 31a can be calculated by the following equation. FIG. 5 is a diagram showing the relationship between the range $d_{na}$ and the optical path deviation $\Delta x$ on the plane A. NA in the following equation is the numerical aperture of the objective lens model 31a. $\phi_1$ and $\phi_2$ shown in FIG. 5 indicate the inner diameter and the outer diameter of the image of the phase plate model 32a in a case where there is no optical path deviation. $t_1$ and $t_2$ shown in FIG. 5 indicate the inner diameter and the outer diameter of the ring-shaped illumination light N in a case where the optical path deviation is $\Delta x$.

$$d_{na} = f \tan(\sin^{-1} NA)$$

Then, assuming that the attenuation rate of the phase plate model 32a is ND (constant), a transmittance T(x, y) for each position of (x, y) on the plane A can be expressed by the following equations.

$$T(x, y) = ND \text{ (at the time of } \phi_1 < \sqrt{x^2 + y^2} < \phi_2)$$

$$T(x, y) = 0 \text{ (at the time of } d_{na} < \sqrt{x^2 + y^2})$$

$$T(x, y) = 1 \text{ (others)}$$

In addition, an incidence lay intensity P(x, y) for each position of (x, y) on the plane A can be expressed by the following equations.

$$P(x, y) = 1 \text{ (at the time of } t_1 < \sqrt{(x-\Delta x)^2 + y^2} < t_2)$$

$$P(x, y) = 0 \text{ (others)}$$

In this time, the incidence lay intensity P(x, y) may be expressed by a Gaussian distribution. In this case, the incidence lay intensity P(x, y) can be expressed by the following equation.

$$P(x, y) = \frac{1}{\sqrt{2\pi\sigma^2}} \exp\left[-\frac{\left[\sqrt{(x-\Delta x)^2 + y^2} - \frac{t_2 + t_1}{2}\right]^2}{2\sigma^2}\right]$$

From the above, a sum $O(\theta_1)$ of the intensity of light passing through the plane A in a case where the inclination of the liquid surface of the meniscus model M is $\theta_1$ can be expressed by the following equation.

$$O(\theta_1) = \iint T(x, y) P(x, y) dx dy$$

By performing the geometric optical simulation based on the operation described above, it is possible to acquire the distribution of the intensity of light passing through each position on the liquid surface of the meniscus model M, that is, the brightness distribution of the phase difference image.

As is apparent from FIG. 4, the position of the phase difference image and the position of the liquid surface inclination $\theta_1$ are slightly shifted from each other by $\Delta x_d$. Therefore, by correcting the estimated position using the following equation, it is possible to estimate the liquid surface shape with high accuracy.

$$\Delta x_d = d \tan\theta_2$$

Figure 6:
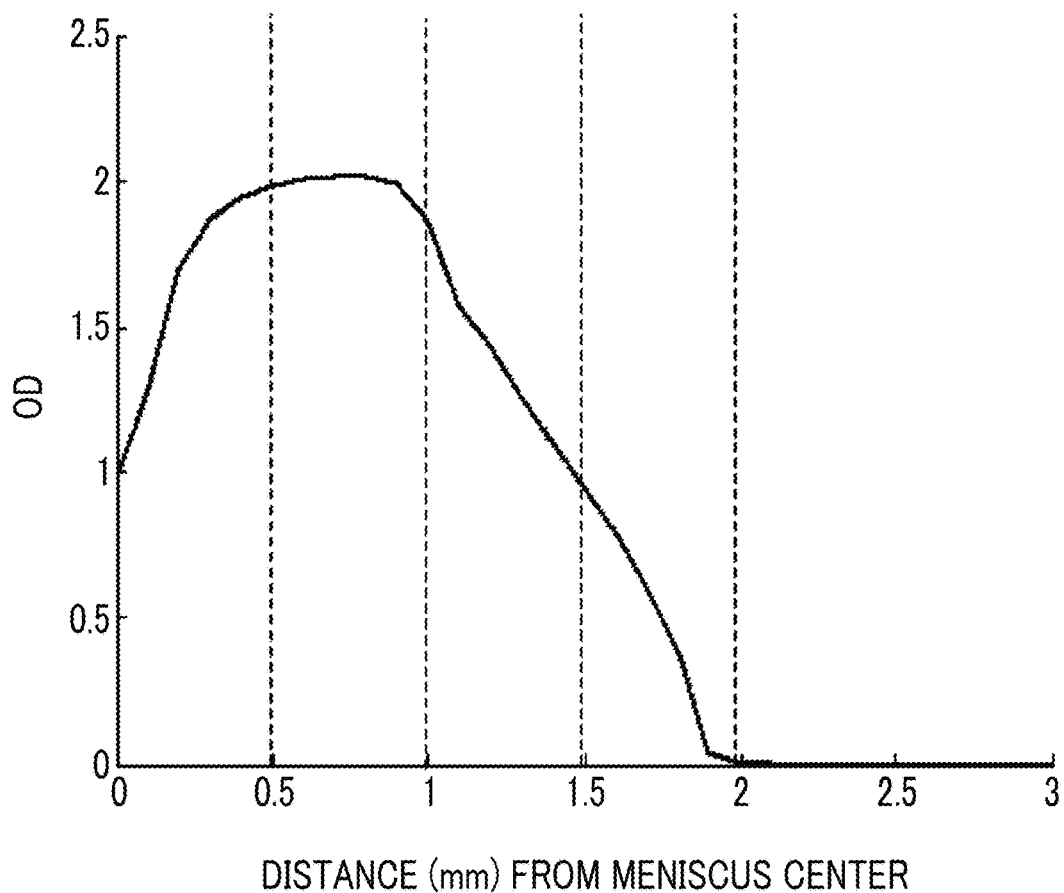
FIG. 6 is a diagram showing an example of the brightness distribution of a phase difference image acquired by a geometric optical simulation.

Then, the brightness distribution of a phase difference image of each of a plurality of liquid surface shapes having different curvatures is acquired, and these brightness distributions are stored in advance in the liquid surface shape estimation unit 54. FIG. 6 is a diagram showing an example of the brightness distribution of a phase difference image acquired by the geometric optical simulation. The brightness distribution shown in FIG. 6 is a brightness distribution on a straight line extending from the center of the meniscus model M toward the outer periphery of the culture container model 60a, and the horizontal axis in FIG. 6 is a distance from the center of the meniscus model M. The center of the meniscus model M is a center position in the central portion of the meniscus described above. In the case of geometric optical simulation, the center of the meniscus model M is the same position as the center position of the culture container model 60a. The optical density on the vertical axis shown in FIG. 6 is a value obtained by normalizing the brightness value on the above-described straight line with the brightness value of the center of the meniscus model M. As shown in FIG. 6, also in the result of the geometric optical simulation, a bright and dark pattern is formed from the central portion of the meniscus toward the outside.

The liquid surface shape estimation unit 54 stores a brightness distribution, such as that shown in FIG. 6, for each of the plurality of liquid surface shapes having different curvatures. Specifically, for example, a brightness distribution corresponding to the curvature R=3, R=4, R=5, and R=6 is stored.

On the other hand, the liquid surface shape estimation unit 54 acquires the phase difference image captured by the imaging unit 40 before adjustment by the adjustment optical system 20 described above, and acquires the brightness distribution of the phase difference image. As a method of capturing a phase difference image before adjustment by the adjustment optical system 20, a phase difference image may be captured with the optical characteristics of the adjustment optical system 20 in the initial state, or a phase difference image may be captured in a state in which the adjustment optical system 20 is retracted from the optical path of the illumination light. In the case of capturing the phase difference image with the optical characteristics of the adjustment optical system 20 in the initial state, the optical parameters of the adjustment optical system 20 in the initial state are also taken into consideration in the geometric optical simulation described above.

Figure 7:
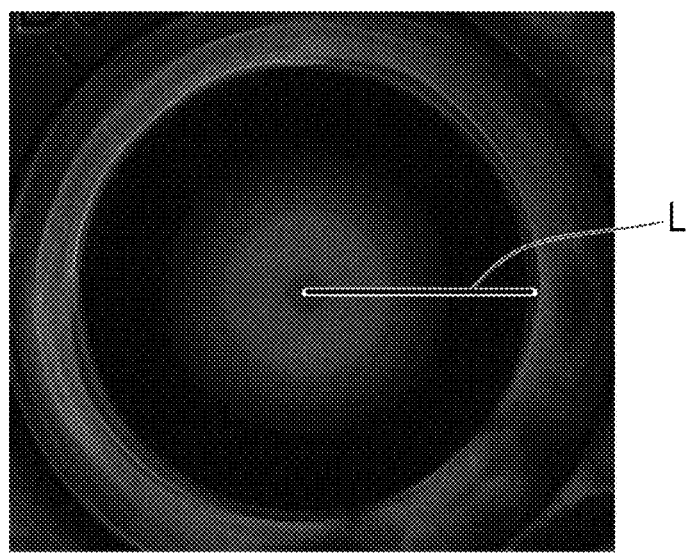
FIG. 7 is a diagram showing an example of a phase difference image captured by an imaging unit before adjustment by an adjustment optical system.

FIG. 7 is a diagram showing an example of a phase difference image captured by the imaging unit 40 before adjustment by the adjustment optical system 20. As shown in FIG. 7, the liquid surface shape estimation unit 54 sets a straight line L, which extends from the central portion of the meniscus toward the outer periphery of the culture container 60, on the phase difference image captured by the imaging unit 40, and acquires the brightness distribution of the phase difference image on the set straight line L. The extension direction of the straight line L set herein is the same as the extension direction of the straight line set on the phase difference image in the case of acquiring the brightness distribution in the geometric optical simulation.

In addition, smoothing processing, such as low pass filter processing, may be performed on the phase difference image before acquiring the brightness distribution of the phase difference image as described above, and the brightness distribution of the phase difference image subjected to the smoothing processing may be acquired. As a result, since it is possible to eliminate brightness changes originating from cells, it is possible to estimate the liquid surface shape more accurately.

In the case of setting the above-described straight line L on the phase difference image captured by the imaging unit 40, it is unknown in which shape the meniscus is formed, unlike in the geometric optical simulation. Therefore, it is necessary to specify the central portion of the meniscus. The shape of the meniscus actually formed on the liquid surface in the culture container 60 differs depending on the type of the culture container 60, the amount of culture solution C, a culture period, and the like, and the central portion of the meniscus does not necessarily match the central portion of the culture container 60.

Therefore, the liquid surface shape estimation unit 54 specifies the central portion of the meniscus based on the brightness of the phase difference image. Specifically, the central portion of the meniscus is specified, for example, by extracting a region having a brightness equal to or less than a threshold value set in advance from the phase difference image and specifying a circular region close to the central portion of the phase difference image in the extracted region. Then, by setting a straight line extending from the center position in the specified central portion of the meniscus toward the outside, the straight line L shown in FIG. 7 is set.

Figure 8:
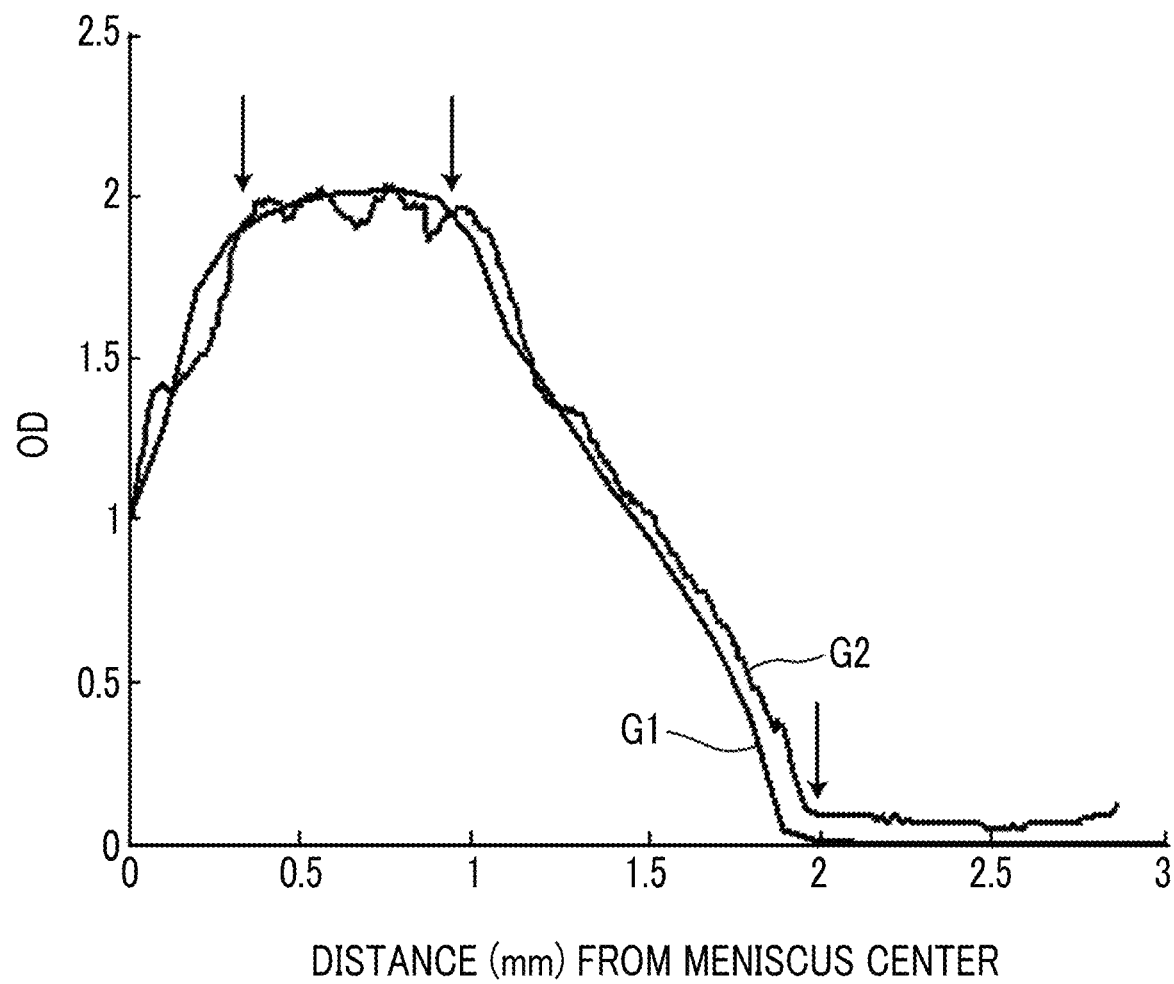
FIG. 8 is a diagram showing examples of a brightness distribution G1 of a phase difference image acquired by the geometric optical simulation and a brightness distribution G2 of a phase difference image captured by an imaging unit.

Then, the liquid surface shape estimation unit 54 calculates a correlation between the brightness distribution of the phase difference image acquired by the geometric optical simulation and the brightness distribution of the phase difference image captured by the imaging unit 40. Specifically, the liquid surface shape estimation unit 54 calculates a correlation between the brightness distribution of the liquid surface shape of the curvature R=3, R=4, R=5, and R=6 stored in advance and the brightness distribution of the phase difference image captured by the imaging unit 40, and specifies the brightness distribution of the liquid surface shape having the highest correlation. FIG. 8 is a diagram showing examples of a brightness distribution G1 of the liquid surface shape of the curvature R=4 and a brightness distribution G2 of a phase difference image captured by the imaging unit 40.

As a method of calculating the correlation between the brightness distribution of the liquid surface shape stored in advance and the brightness distribution of the phase difference image captured by the imaging unit 40, for example, the correlation between the brightness distributions may be calculated by using a correlation function. Without being limited to the method using the correlation function, for example, as indicated by an arrow in FIG. 8, inflection points in the brightness distribution of the liquid surface shape stored in advance and the brightness distribution of the phase difference image captured by the imaging unit 40 are obtained, and the total value of the differences of the brightness values (optical densities) of the corresponding inflection points of the brightness distributions is calculated. Then, the above-described total value may be calculated for each of the brightness distributions of a plurality of liquid surface shapes stored in advance, and the brightness distribution having the smallest total value may be specified as a brightness distribution having the highest correlation.

Then, the liquid surface shape estimation unit 54 specifies a liquid surface shape of the curvature having the highest correlation with the brightness distribution of the phase difference image captured by the imaging unit 40, and estimates the specified liquid surface shape of the curvature as the liquid surface shape of the culture solution C in the culture container 60.

The above is the description of the estimation of the liquid surface shape by the liquid surface shape estimation unit 54 of the present embodiment.

Returning to FIG. 1, the adjustment information acquisition unit 55 acquires adjustment information for adjusting the optical characteristics of the adjustment optical system 20 based on the liquid surface shape estimated by the liquid surface shape estimation unit 54 as described above. Specifically, the adjustment information acquisition unit 55 of the present embodiment acquires the inclination angle of the liquid surface in the imaging region of the phase difference image based on the liquid surface shape estimated by the liquid surface shape estimation unit 54, and calculates the refraction angle of illumination light in the imaging region based on the inclination angle and the refractive index of the culture solution C. In the present embodiment, the inside of the culture container 60 is scanned with illumination light as described above, and a phase difference image is captured for each of a plurality of imaging regions obtained by dividing the inside of the culture container 60. Accordingly, the refraction angle of illumination light is calculated for each imaging region.

The adjustment information acquisition unit 55 outputs information of the refraction angle of the illumination light in each imaging region to the adjustment optical system control unit 51 as adjustment information.

The adjustment optical system control unit 51 adjusts the optical characteristics of the adjustment optical system 20 based on the information on the refraction angle of the illumination light calculated by the adjustment information acquisition unit 55. Specifically, a look-up table in which the refraction angle of the illumination light in the imaging region is associated with the amount of adjustment of the adjustment optical element 21 of the adjustment optical system 20 is set in advance in the adjustment optical system control unit 51. Then, based on the information of the refraction angle of the illumination light, the adjustment optical system control unit 51 acquires the amount of adjustment of the adjustment optical element 21 of the adjustment optical system 20 with reference to the look-up table described above, and outputs a control signal corresponding to the amount of adjustment to the adjustment optical system driving unit 22. As the amount of adjustment of the adjustment optical element 21 of the adjustment optical system 20, as described above, there are positions in the X, Y, and Z directions, focal power, optical axis direction, and the like of the adjustment optical element 21.

The control signal output from the adjustment optical system control unit 51 is input to the adjustment optical system driving unit 22, and the adjustment optical system driving unit 22 adjusts the optical characteristics by adjusting the focal power, positions in the X, Y, and Z directions, and optical axis direction of the adjustment optical element 21 based on the input control signal.

In the case of adjusting refraction due to the meniscus by exchanging the plurality of adjustment optical elements 21, the adjustment information acquisition unit 55 acquires, as adjustment information, information specifying the type of the adjustment optical element 21 having the optical characteristics corresponding to the liquid surface shape estimated by the liquid surface shape estimation unit 54. It is assumed that a table, in which the liquid surface shape is associated with the information specifying the type of the adjustment optical element 21 corresponding to the liquid surface shape, is set in advance in the adjustment information acquisition unit 55.

Then, the information specifying the type of the adjustment optical element 21 acquired by the adjustment information acquisition unit 55 is output to the adjustment optical system control unit 51, and the adjustment optical system control unit 51 performs automatic switching to the adjustment optical element 21 corresponding to the liquid surface shape based on the input information. In addition, the information specifying the type of the adjustment optical element 21 may be displayed on the display device 70 to notify the user of the information, so that the user manually replaces the adjustment optical element 21.

The imaging optical system control unit 52 controls the driving of the imaging optical system driving unit 34 to move the objective lens 31 in the Z direction. Specifically, the imaging optical system control unit 52 of the present embodiment performs autofocus control by moving the objective lens 31 in the Z direction using the imaging optical system driving unit 34 in the case of capturing the phase difference image.

The stage control unit 53 controls the driving of the stage driving unit 62 to move the stage 61 in the X, Y, and Z directions. The stage control unit 53 moves the stage 61 in the X and Y directions as described above to scan the inside of the culture container 60 with illumination light, so that a phase difference image is captured for each of a plurality of imaging regions divided within the culture container 60 (for example, within one well).

The input device 80 and the display device 70 are connected to the microscope control device 50. The input device 80 includes an input device, such as a keyboard or a mouse, and receives a setting input from the user.

The display device 70 is a display device, such as a liquid crystal display, and displays a phase difference image or the like captured by the imaging unit 40. The display device 70 may be configured by a touch panel so that the display device 70 also serves as an input device.

Figure 9:
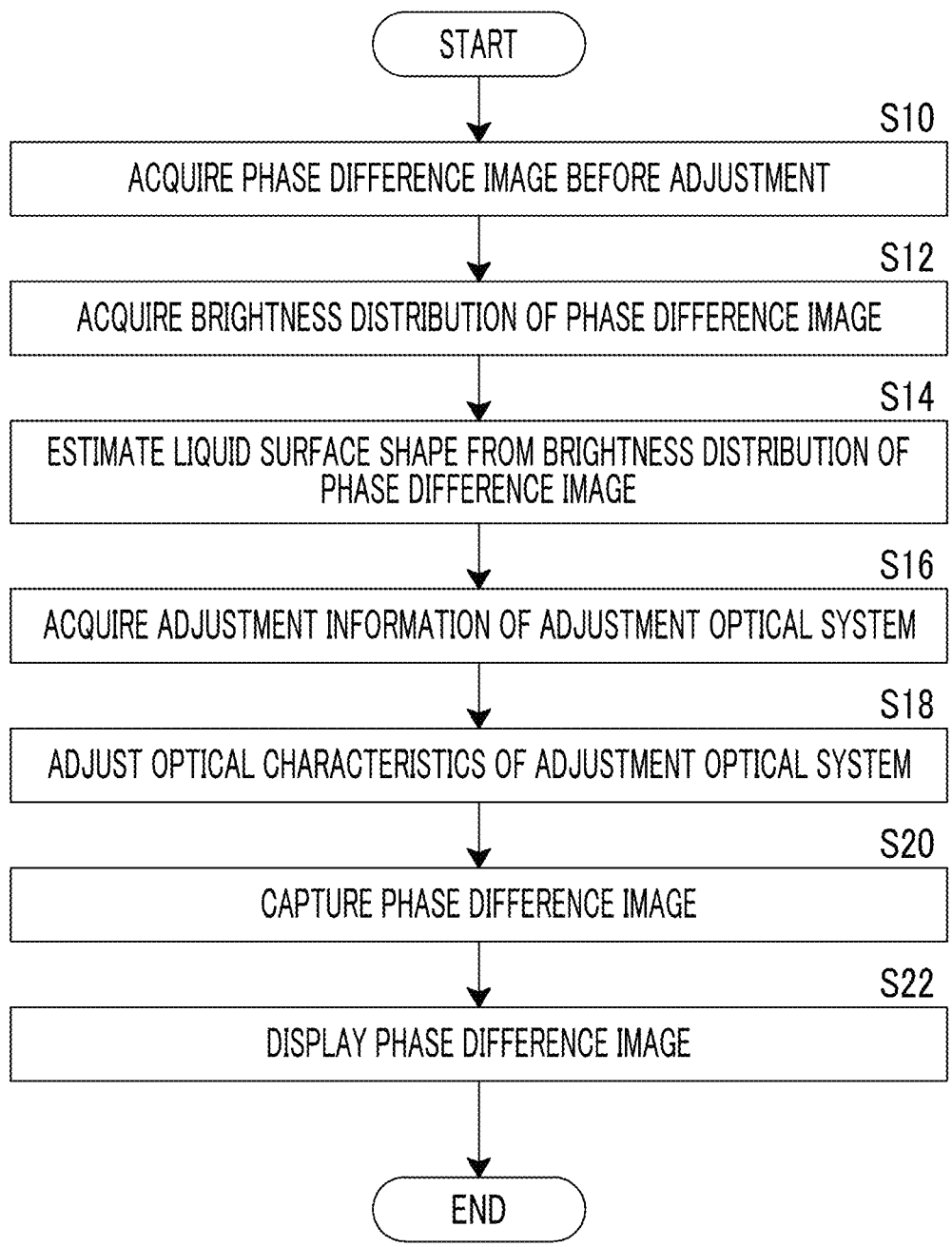
FIG. 9 is a flowchart illustrating the operation of the microscope system using an embodiment of the phase contrast microscope of the present invention.

Next, the operation of the microscope system of the present embodiment will be described with reference to the flowchart shown in FIG. 9.

First, the culture container 60 in which the observation target S and the culture solution C are contained is placed on the stage 61. Then, a phase difference image of the observation target S before adjustment by the adjustment optical system 20 is captured and acquired by the liquid surface shape estimation unit 54 (S10).

The liquid surface shape estimation unit 54 sets the straight line L, which extends from the central portion of the meniscus toward the outer periphery of the culture container 60, on the phase difference image before adjustment as described above, and acquires the brightness distribution of the phase difference image on the set straight line L (S12).

Then, the liquid surface shape estimation unit 54 calculates a correlation between the brightness distribution of the phase difference image before the adjustment and the brightness distribution of the liquid surface shape of the curvature R=3, R=4, R=5, and R=6 stored in advance, specifies the brightness distribution of the liquid surface shape having the highest correlation with the brightness distribution of the phase difference image before the adjustment, and estimates the specified liquid surface shape as the liquid surface shape of the culture solution C in the culture container 60 (S14).

The estimation result of the liquid surface shape is output to the adjustment information acquisition unit 55, and the adjustment information acquisition unit 55 acquires adjustment information for adjusting the optical characteristics of the adjustment optical system 20 based on the estimated liquid surface shape (S16).

Then, the adjustment information acquired by the adjustment information acquisition unit 55 is output to the adjustment optical system control unit 51, and the adjustment optical system control unit 51 adjusts the optical characteristics of the adjustment optical system 20 based on the input adjustment information (S18).

Then, after the optical characteristics of the adjustment optical system 20 are adjusted as described above so that the influence of refraction due to the meniscus formed on the liquid surface of the culture solution C is eliminated, the phase difference image of the observation target S is captured again by the imaging unit 40 (S20).

The phase difference image captured by the imaging unit 40 is output to the display device 70 and displayed by the display device 70.

According to the microscope system of the embodiment described above, the liquid surface shape of the culture solution C in the culture container 60 is estimated based on the brightness distribution of the phase difference image captured by the imaging unit 40 that captures a phase difference image for observation. Therefore, it is possible to estimate the liquid surface shape of the culture solution C in the culture container 60 without providing a new measurement system for estimating the liquid surface shape. Then, since the optical characteristics of the adjustment optical system 20 are adjusted based on the estimated liquid surface shape and then the phase difference image of the observation target is captured, it is possible to capture a phase difference image in which the influence of the meniscus is suppressed.

In the embodiment described above, in the case of estimating the liquid surface shape, one straight line L extending from the central portion of the meniscus toward the outer periphery of the culture container 60 is set on the phase difference image captured by the imaging unit 40, and the brightness distribution on the straight line L is used as a representative of the brightness distribution of the entire phase difference image. However, a plurality of straight lines extending from the central portion of the meniscus toward the outer periphery may be set. That is, the meniscus formed in the culture container 60 is not necessarily formed with the same curvature in each direction from the center toward the outer periphery of the culture container 60.

Figure 10:
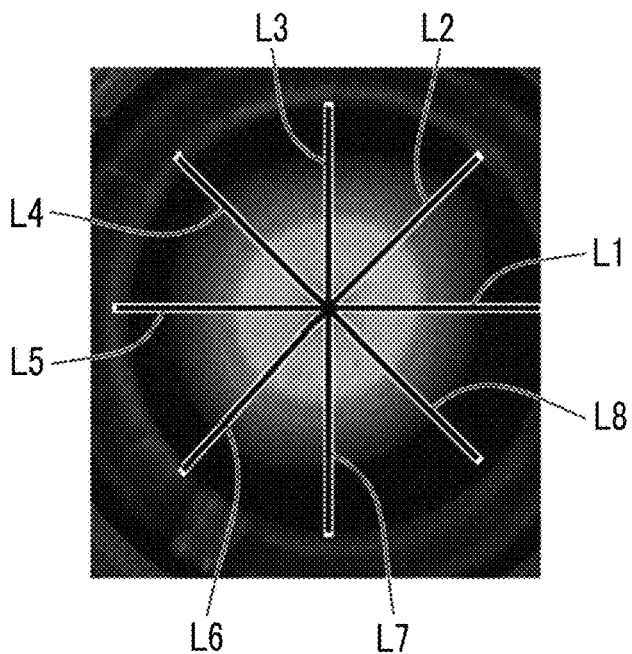
FIG. 10 is a diagram illustrating an example in which eight straight lines L1 to L8 are set from a central portion of a meniscus toward the outer periphery.

Therefore, for example, as shown in FIG. 10, eight straight lines L1 to L8 extending from the central portion of the meniscus toward the outer periphery may be set, and the brightness distribution for each straight line may be acquired. Then, by calculating the curvature of the liquid surface shape corresponding to the brightness distribution for each straight line, the curvature of the liquid surface shape may be obtained for each of the eight directions. As a result, it is possible to estimate the liquid surface shape with higher accuracy.

In the case of calculating the curvature of the liquid surface shape for a plurality of directions as described above, an average value or a mode value of these curvatures may be calculated as a representative value, and adjustment information of the adjustment optical system 20 may be acquired based on the curvature of the representative value. Alternatively, the adjustment information of the adjustment optical system 20 may be acquired for each region divided for each direction using the curvature obtained for each direction. As a method of dividing a region for each direction, for example, division into fan-shaped regions each including a straight line extending in each direction at the center of the circular arc may be applied.

In the embodiment described above, in the case of estimating the liquid surface shape, the curvature R of the liquid surface shape is calculated on the assumption that the liquid surface shape is close to a spherical shape. However, for example, since the flat bottom surface portion of the meniscus increases according to the size of the culture container 60, the liquid surface shape does not become a spherical shape. For this reason, there is a possibility that the estimation accuracy of the liquid surface shape will be lowered. Therefore, the liquid surface shape may be estimated as follows.

Figure 11:
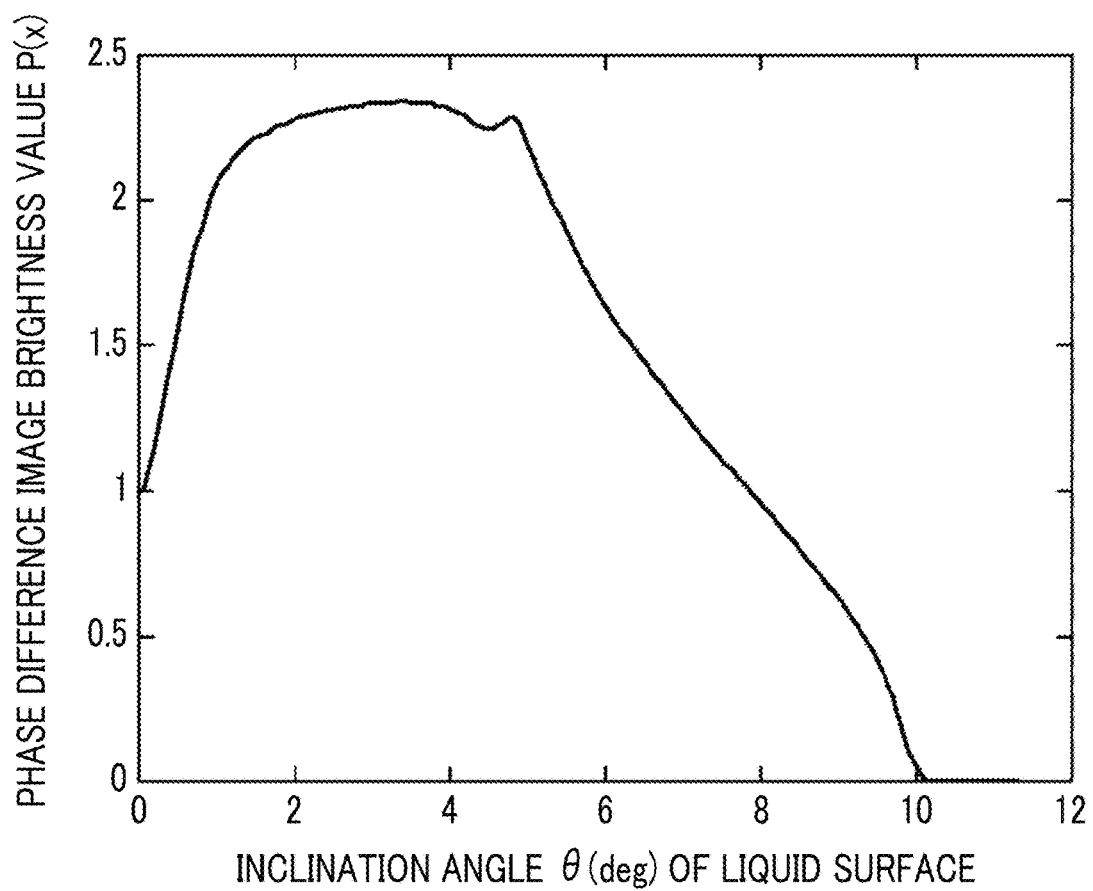
FIG. 11 is a diagram showing an example of a profile in which a brightness value P(x) of a phase difference image is associated with an inclination angle θ of the liquid surface.

First, using the geometric optical simulation, a profile shown in FIG. 11 is acquired in which a brightness value P(x) of the phase difference image and the inclination angle θ of the liquid surface are associated with each other. The brightness value P(x) indicates a brightness value at each position x between the central portion of the meniscus model M to the outer periphery of the culture container model 60a. The inclination angle θ of the liquid surface is the inclination angle $\theta_1$ shown in FIG. 4. The profile shown in FIG. 11 can be acquired using the calculation result in the embodiment described above.

Then, as in the embodiment described above, the phase difference image captured by the imaging unit 40 is acquired, the phase difference image is normalized so that the brightness value of the central portion of the meniscus becomes 1, and smoothing processing is performed on the normalized phase difference image to remove high frequency noise originating from cells.

Figure 12:
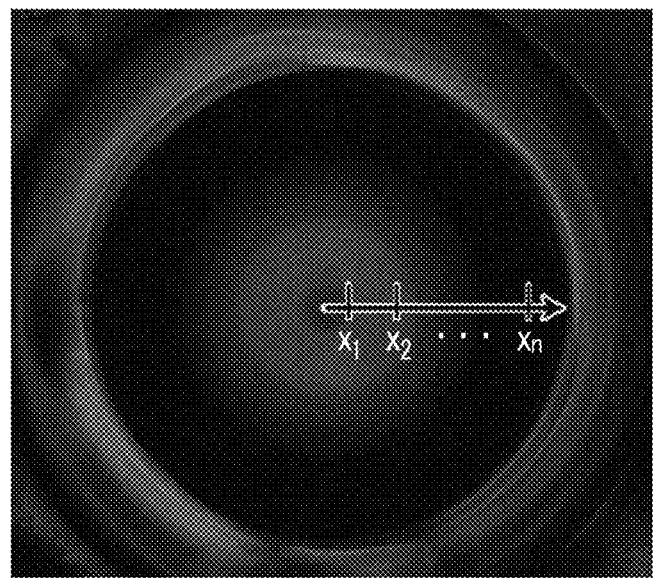
FIG. 12 is a diagram illustrating a method of calculating the inclination angle of the liquid surface using the profile shown in FIG. 11.

Then, on the phase difference image subjected to the smoothing processing, a straight line extending from the central portion of the meniscus toward the outer periphery is set as shown in FIG. 12. By scanning the straight line from the center of the meniscus, brightness values at respective positions $x_1, x_2, \ldots, x_n$ are acquired. Then, using the profile shown in FIG. 11, the inclination angle θ of the liquid surface corresponding to the brightness value P(x) at each position x is calculated. As a result, since it is possible to calculate the inclination angle θ of the liquid surface at each position on the straight line shown in FIG. 12, it is possible to estimate the shape of the liquid surface on the straight line.

Figure 13:
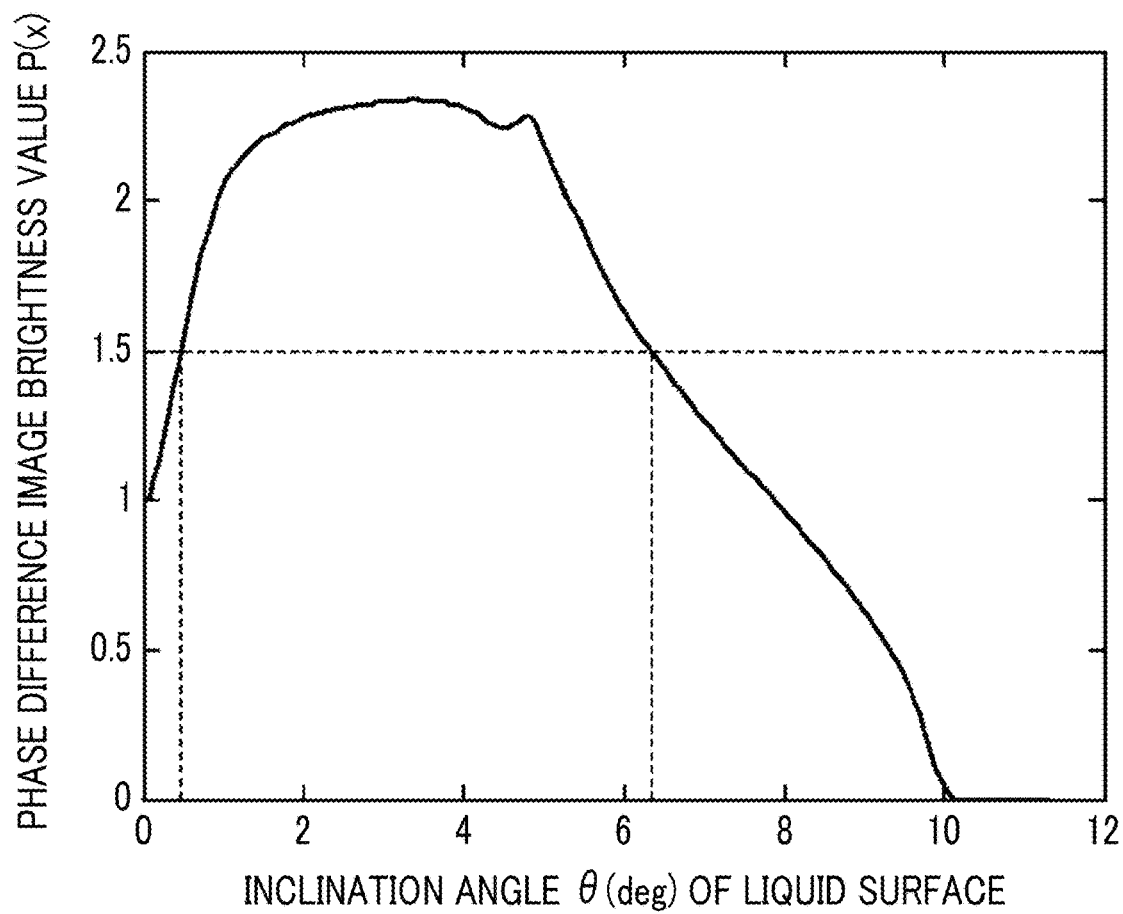
FIG. 13 is a diagram illustrating a method of determining the inclination angle in a case where there are a plurality of candidates for the inclination angle of the liquid surface.

In the case of calculating the inclination angle θ of the liquid surface using the profile shown in FIG. 11, two inclination angles θ may be calculated for the same brightness value P(x) (1.5 in the example shown in FIG. 13) as shown in FIG. 13. Therefore, in a case where the brightness value is acquired sequentially from the center of the meniscus as described above and the inclination angle θ corresponding to the brightness value is sequentially calculated, the inclination angle of the liquid surface may be set to increase as the distance from the center of the meniscus increases. In a case where there are a plurality of candidates for the inclination angle θ, the smallest inclination angle θ may be selected first.

In the microscope system of the embodiment described above, the adjustment optical element 21 is provided to eliminate the influence of the refraction of illumination light due to the meniscus formed on the liquid surface. However, such an adjustment optical element 21 does not necessarily need to be provided. For example, the influence of the refraction of illumination light due to the meniscus may be eliminated by moving the slit plate 12 in the X and Y directions based on the adjustment information or by moving the phase plate 32 in the X and Y directions based on the adjustment information. That is, the slit plate 12 or the phase plate 32 may be used as the adjustment optical system in the present invention.

In the microscope system of the embodiment described above, the adjustment optical element 21 is provided between the condenser lens 13 and the culture container 60. However, the position of the adjustment optical element 21 is not limited thereto. For example, the adjustment optical element 21 may be provided at other positions, such as between the white light source 11 and the slit plate 12, between the phase plate 32 and the condenser lens 13, and between the culture container 60 and the objective lens 31.

EXPLANATION OF REFERENCES

- 10: illumination light emission unit
- 11: white light source
- 12: slit plate
- 12a: slit plate model
- 13: condenser lens
- 13a: condenser lens model
- 20: adjustment optical system
- 21: adjustment optical element
- 22: adjustment optical system driving unit
- 30: imaging optical system
- 31: objective lens
- 31a: object lens model
- 32: phase plate
- 32a: phase plate model
- 33: imaging lens
- 34: imaging optical system driving unit
- 40: imaging unit
- 50: microscope control device
- 51: adjustment optical system control unit
- 52: imaging optical system control unit
- 53: stage control unit
- 54: liquid surface shape estimation unit
- 55: adjustment information acquisition unit
- 60: culture container
- 60a: culture container model
- 61: stage
- 62: stage driving unit
- 70: display device
- 80: input device
- C: culture solution
- Ca: culture solution model
- G1: brightness distribution
- G2: brightness distribution
- L: straight line
- L1 to L8: straight line
- M: meniscus model
- N: ring-shaped illumination light
- P: observation target placement surface

What is claimed is:

1. A phase contrast microscope, comprising:
   an illumination light emission unit that emits illumination light for phase difference measurement to a container in which a liquid and an observation target are contained;
   an imaging unit that images the observation target irradiated with the illumination light;
   an adjustment optical system that adjusts refraction of the illumination light due to a liquid surface shape of the liquid in the container;
   a liquid surface shape estimation unit that estimates the liquid surface shape of the liquid in the container based on a brightness distribution of a phase difference image of the observation target captured by the imaging unit; and
   an adjustment information acquisition unit that acquires adjustment information for adjusting optical characteristics of the adjustment optical system based on the liquid surface shape estimated by the liquid surface shape estimation unit.

2. The phase contrast microscope according to claim 1, further comprising:
   an adjustment optical system control unit that adjusts the optical characteristics of the adjustment optical system based on the adjustment information acquired by the adjustment information acquisition unit.

3. The phase contrast microscope according to claim 2, wherein the liquid surface shape estimation unit estimates the liquid surface shape of the liquid in the container based on a brightness distribution of a phase difference image acquired by performing a geometric optical simulation using a liquid surface shape set in advance.

4. The phase contrast microscope according to claim 3, wherein the liquid surface shape estimation unit sets at least one straight line, which extends from a central portion of a meniscus formed in the container toward an outer periphery of the container, on the phase difference image captured by the imaging unit, and estimates the liquid surface shape of the liquid in the container based on a brightness distribution of the phase difference image on the set straight line.

5. The phase contrast microscope according to claim 2, wherein the liquid surface shape estimation unit sets at least one straight line, which extends from a central portion of a meniscus formed in the container toward an outer periphery of the container, on the phase difference image captured by the imaging unit, and estimates the liquid surface shape of the liquid in the container based on a brightness distribution of the phase difference image on the set straight line.

6. The phase contrast microscope according to claim 1, wherein the liquid surface shape estimation unit estimates the liquid surface shape of the liquid in the container based on a brightness distribution of a phase difference image acquired by performing a geometric optical simulation using a liquid surface shape set in advance.

7. The phase contrast microscope according to claim 6, wherein the liquid surface shape estimation unit estimates the liquid surface shape of the liquid in the container based on brightness distributions of a plurality of phase difference images acquired by performing a geometric optical simulation using a plurality of liquid surface shapes that have different curvatures and are set in advance.

8. The phase contrast microscope according to claim 7, wherein the liquid surface shape estimation unit calculates the correlation based on a brightness value of an inflection point in the brightness distribution of the phase difference image acquired by using the geometric optical simulation and a brightness value of an inflection point in the brightness distribution of the phase difference image captured by the imaging unit.

9. The phase contrast microscope according to claim 7, wherein the liquid surface shape estimation unit sets at least one straight line, which extends from a central portion of a meniscus formed in the container toward an outer periphery of the container, on the phase difference image captured by the imaging unit, and estimates the liquid surface shape of the liquid in the container based on a brightness distribution of the phase difference image on the set straight line.

10. The phase contrast microscope according to claim 6, wherein the liquid surface shape estimation unit estimates the liquid surface shape of the liquid in the container by calculating a correlation between the brightness distribution of the phase difference image acquired by using the geometric optical simulation and the brightness distribution of the phase difference image captured by the imaging unit.

11. The phase contrast microscope according to claim 7, wherein the liquid surface shape estimation unit estimates the liquid surface shape of the liquid in the container by calculating a correlation between the brightness distribution of the phase difference image acquired by using the geometric optical simulation and the brightness distribution of the phase difference image captured by the imaging unit.

12. The phase contrast microscope according to claim 11, wherein the liquid surface shape estimation unit calculates the correlation using a correlation function.

13. The phase contrast microscope according to claim 11, wherein the liquid surface shape estimation unit calculates the correlation based on a brightness value of an inflection point in the brightness distribution of the phase difference image acquired by using the geometric optical simulation and a brightness value of an inflection point in the brightness distribution of the phase difference image captured by the imaging unit.

14. The phase contrast microscope according to claim 10, wherein the liquid surface shape estimation unit calculates the correlation using a correlation function.

15. The phase contrast microscope according to claim 10, wherein the liquid surface shape estimation unit sets at least one straight line, which extends from a central portion of a meniscus formed in the container toward an outer periphery of the container, on the phase difference image captured by the imaging unit, and estimates the liquid surface shape of the liquid in the container based on a brightness distribution of the phase difference image on the set straight line.

16. The phase contrast microscope according to claim 6, wherein the liquid surface shape estimation unit sets at least one straight line, which extends from a central portion of a meniscus formed in the container toward an outer periphery of the container, on the phase difference image captured by the imaging unit, and estimates the liquid surface shape of the liquid in the container based on a brightness distribution of the phase difference image on the set straight line.

17. The phase contrast microscope according to claim 1, wherein the liquid surface shape estimation unit sets at least one straight line, which extends from a central portion of a meniscus formed in the container toward an outer periphery of the container, on the phase difference image captured by the imaging unit, and estimates the liquid surface shape of the liquid in the container based on a brightness distribution of the phase difference image on the set straight line.

18. The phase contrast microscope according to claim 17, wherein the liquid surface shape estimation unit sets the straight lines extending in a plurality of different directions, and estimates the liquid surface shape of the liquid in the container based on brightness distributions of phase difference images on the plurality of straight lines.

19. The phase contrast microscope according to claim 1, wherein the liquid surface shape estimation unit performs smoothing processing on the phase difference image captured by the imaging unit, and estimates the liquid surface shape of the liquid in the container based on a brightness distribution of a phase difference image subjected to the smoothing processing.

20. An imaging method, comprising:

using the phase contrast microscope according to claim 1;

capturing the phase difference image of the observation target by emitting the illumination light for the phase difference measurement to the container in which the liquid and the observation target are contained;

estimating the liquid surface shape of the liquid based on the brightness distribution of the captured phase difference image;

acquiring the adjustment information for adjusting the optical characteristics of the adjustment optical system, which adjusts the refraction of light due to the liquid surface shape of the liquid in the container, based on the estimated liquid surface shape;

emitting the illumination light to the container after the optical characteristics of the adjustment optical system are adjusted based on the adjustment information; and imaging the observation target irradiated with the illumination light.

* * * * *